United States Patent
Shahar et al.

(10) Patent No.: US 8,555,050 B2
(45) Date of Patent: Oct. 8, 2013

(54) APPARATUS AND METHOD THEREOF FOR RELIABLE BOOTING FROM NAND FLASH MEMORY

(75) Inventors: Boaz Shahar, Raanana (IL); Dan Beygelman, Lod (IL); Oren Wolach, Kfar Saba (IL)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 12/836,962

(22) Filed: Jul. 15, 2010

(65) Prior Publication Data

US 2012/0017071 A1 Jan. 19, 2012

(51) Int. Cl.
- *G06F 9/00* (2006.01)
- *G06F 9/24* (2006.01)
- *G06F 12/00* (2006.01)

(52) U.S. Cl.
USPC .................................. 713/2; 713/1; 711/103

(58) Field of Classification Search
USPC ....................................................... 713/1, 2
See application file for complete search history.

(56) References Cited

U.S. PATENT DOCUMENTS

| | | | |
|---|---|---|---|
| 7,061,804 B2 * | 6/2006 | Chun et al. | 365/185.17 |
| 7,234,052 B2 * | 6/2007 | Lee et al. | 713/2 |
| 7,370,138 B2 | 5/2008 | Kim | |
| 7,533,253 B2 * | 5/2009 | Jo | 713/2 |
| 7,610,433 B2 * | 10/2009 | Randell et al. | 711/101 |
| 8,175,012 B2 * | 5/2012 | Chu et al. | 370/278 |
| 2005/0050314 A1 | 3/2005 | Ohkita et al. | |
| 2006/0010282 A1 | 1/2006 | Kim | |
| 2006/0184724 A1 | 8/2006 | Meir et al. | |
| 2006/0245274 A1 | 11/2006 | Choi et al. | |
| 2008/0046641 A1 | 2/2008 | Lasser | |
| 2008/0104311 A1 | 5/2008 | Meir et al. | |
| 2008/0294838 A1 | 11/2008 | Houston et al. | |
| 2009/0049232 A1 | 2/2009 | Brahmadathan et al. | |
| 2010/0049909 A1 | 2/2010 | Lasser | |

* cited by examiner

*Primary Examiner* — Suresh Suryawanshi
(74) *Attorney, Agent, or Firm* — Sterne, Kessler, Goldstein & Fox P.L.L.C.

(57) ABSTRACT

An apparatus for enabling booting from a NAND flash memory comprises a NAND flash controller connected to the NAND flash memory, wherein the NAND flash memory is configured to include at least a starter section for storing boot code, the starter section includes a predefined number of blocks to store copies of the boot code duplicated in a configurable number of blocks; and a fetch emulator for fetching a valid and complete starter block that includes the boot code.

22 Claims, 4 Drawing Sheets

| Block 310 --- Bad block -- | | | |
|---|---|---|---|
| < 320-0 – 320-6> Valid pages | 320-7 X | < 320-8 – 320-11> Valid pages | |
| < 330-0 – 330-7> Valid pages | 330-8 X | < 330-8 – 330-11> Valid pages | |
| < 340-0 – 340-7> Valid pages | 340-8 X | < 340-8 – 340-11> Valid pages | |

FIG. 3

APPARATUS AND METHOD THEREOF FOR RELIABLE BOOTING FROM NAND FLASH MEMORY

TECHNICAL FIELD

The present invention generally relates to NAND flash memory controllers.

BACKGROUND OF THE INVENTION

A flash memory is a popular storage means for storing software codes and user data. There are two types of flash memories: NOR flash and NAND flash. NOR flash memories are typically characterized by fewer errors, excellent data stability, and a semipermanent life span. The storage capacity of NOR flash memories is very limited (e.g., 128 MB). On the other hand, the NAND flash memories are designed to provide mass storage (e.g., 32 GB) and are faster and cheaper than the NOR types. However, NAND flash memories suffer from a major drawback that cells of the memory are not reliable. Specifically, a NAND flash memory device usually contains non-functional blocks which may be a result of the manufacturing process or operation of the memory. The non-functional blocks are also referred to as "bad blocks."

A typical system on chip (SoC) includes a NAND flash memory and controller for controlling the same, an internal memory, and a CPU. A NAND flash memory stores system initialization and operating system (OS) code. When booting the CPU, this code is loaded into the internal memory, and thereafter the CPU executes the OS operations directly from the internal memory. This operation is initiated by the boot code. Storing the boot code in the NAND flash memory may present a problem of halting the CPU from booting if such code resides in a bad block.

In the related art, three techniques have been suggested to ensure the booting of the SoC. In accordance with one technique the boot code resides in a NOR flash memory device that is considered reliable. The CPU boots from the NOR flash memory, and then uses the NAND flash memory for bulk storage. The disadvantage of such a technique is that it requires an additional costly memory. Another technique is based on a read-only-memory (ROM) integrated in the SoC. The ROM is burnt with the boot code at the fabrication of the SoC. The drawback of this technique is that the boot code cannot be changed or modified once the SoC is fabricated. Thus, a bug in the boot code may result in an inoperable device. Another technique discussed in the related art includes saving the boot code in 0-th block of the NAND flash memory. This block is guaranteed to be valid by the memory's manufacturer. At the SoC booting, the boot code can always be copied from block 0 to the internal memory and be executed therefrom. This solution is limited to NAND flash memories with valid 0-th block. In addition, the 0-th block can be damaged or unexpectedly erased during the operation.

Thus, it would be highly advantageous to provide a solution that would ensure reliable booting.

SUMMARY OF THE INVENTION

Certain embodiments of the invention include an apparatus for enabling reliable booting from a NAND flash memory; a NAND flash controller connected to the NAND flash memory, wherein the NAND flash memory is configured to include at least a starter section for storing boot code, the starter section includes a predefined number of blocks to store copies of the boot code duplicated in a configurable number of blocks; and a fetch emulator for fetching a valid and complete starter block that includes the boot code.

Certain embodiments of the invention also include a method for ensuring reliable booting from a NAND flash memory. The method comprises receiving a fetch instruction from a central processing unit (CPU) to retrieve boot code; mapping good blocks in a starter section, wherein the starter section is part of the NAND flash memory and includes a configurable number of blocks to store copies of the boot code duplicated in the configurable number of blocks; fetching a valid and complete starter block from the starter section; and instructing the CPU to boot from the boot code residing in the valid and complete starter block.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 3 is an arrangement of an exemplary starter section; and

DETAILED DESCRIPTION OF THE INVENTION

Figure 1:
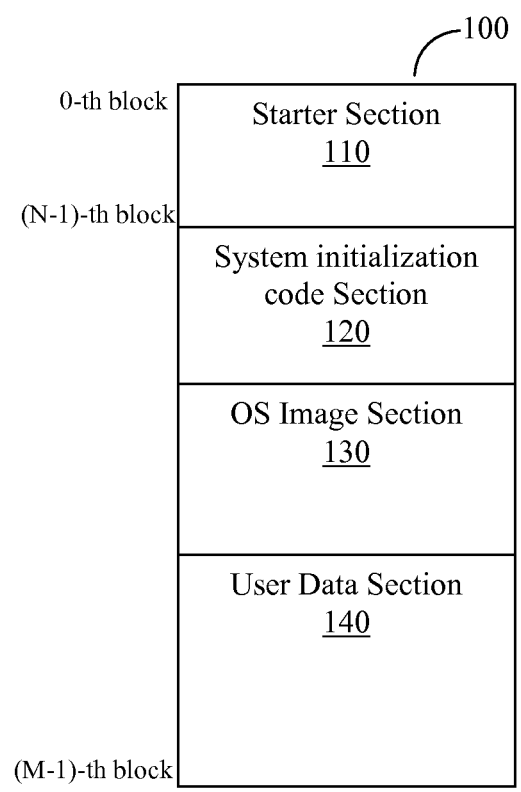
FIG. 1 is an arrangement of a NAND flash memory according to an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an arrangement of a NAND flash memory 100 according to an embodiment of the invention. The NAND flash memory 100 includes M blocks and is configured with 4 different sections: starter 110, system initialization code 120, Operating System (OS) image 130, and user data 140. The starter section 110 contains the boot code initially executed by a CPU. In accordance with an embodiment of the invention, the starter section 110 includes N blocks (where N is an integer number greater than 2) where the first block of section 110 starts at the 0-th block. The size of the boot code is always less than or equal to a size of a single block in the memory 100. Typically, the boot code is between 4 KB to 16 KB, where the size of a block is 16 KB. Thus, according to certain embodiments of the invention, the boot code is duplicated N times, i.e., as the number of blocks in the starter section 110. As will be described in detail below, storing the boot code in the starter section 110 allows to "execute in place" (XIP), i.e., booting the SoC from the NAND flash memory 100.

The system initialization code section 120 includes executable code designed according to the type OS and includes instructions that enable the CPU to load the OS from the NAND flash memory 100 to an internal memory while the CPU is booting. The OS image section 130 maintains a code image of the OS. The user data section 140 contains executable code of software applications for execution by the SoC.

A configurable number of bytes in the NAND flash memory 100 are spare blocks. These blocks store, for example, error correction codes (ECC) of content stored in the flash memory 100, a map of bad blocks, and other parameters associated with the different sections of the memory 100. For example, the stored parameters include checksum values, the size of the starter section 110, an indication if each block is good or bad, and so on. A NAND flash memory may be read or written in page units, or may be deleted in block page units (i.e., in units of several pages). For example, a 32 MB NAND flash memory, a single page is composed of 512 bytes+16 bytes (i.e., a spare area), a single block is composed of 32 pages, and an overall flash memory is composed of 2048 blocks.

Figure 2:
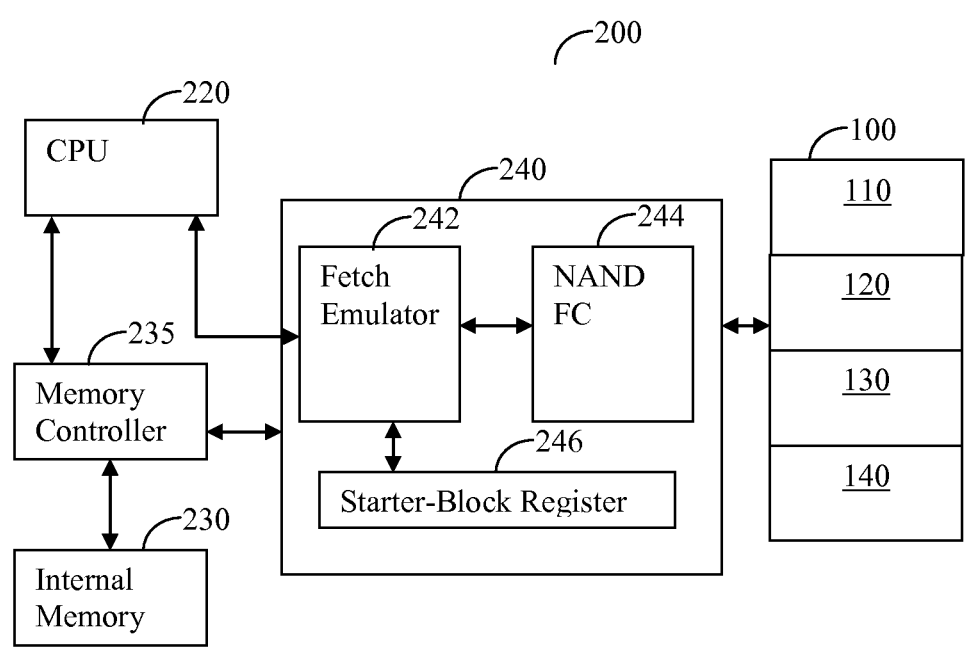
FIG. 2 is a block diagram of SoC operable according to an embodiment of the invention.

FIG. 2 shows an exemplary and non-limiting block diagram of SoC 200 operable according to an embodiment of the invention. The SoC 200 includes a NAND flash memory 100, a CPU 220, an internal (or host) memory 230, a memory controller 235, and an apparatus 240. The NAND flash memory 100 is configured as described above with reference to FIG. 1. The internal memory 230 is a random access memory (RAM), such as static RAM (SRAM) or a dynamic RAM (DRAM). The content loaded into internal memory 230 is accessed by CPU 220 during the normal operation of the SoC. It should be noted that the internal memory 230 may preferably be in a form of a flash memory, however, this should not be confused with the NAND flash memory 100. The CPU 220 reads and writes data from the internal memory 230 through the memory controller 235. When the CPU 220 boots, the OS image is copied from the NAND flash memory 100 to the internal memory 230, under the control of apparatus 240.

The apparatus 240 is implemented according to certain embodiments of the invention to enable reliable booting of the CPU 220 from the NAND flash memory 100. The apparatus 240 includes a fetch emulator 242 and a NAND flash controller (FC) 244. The fetch emulator 242 emulates the execution of the boot code in the starter section 110, thereby enabling in place booting from the NAND flash memory 100. When the SoC boots up, e.g., once it is powered on or reset, the CPU 220 issues a fetch instruction to start the booting process. The fetch emulator 242 generates a sequence of operations that cause the NAND FC 244 to retrieve specific pages designated by the starter section 110. The boot code is at most one data block (hereinafter a "starter block"). Thus, in order to ensure reliable booting the apparatus 240 fetches a valid starter block. Particularly, the starter block may be consisted of pages from more than one block of the starter section 110. With this aim, the fetch emulator maps the good blocks in the starter section 110. The mapping information is saved in a Starter-Block Reregister 246 included in the apparatus 240. The Starter-Block Reregister 246 is N bits long, each bit designates the validity of a respective block in the starter section 110. In accordance with an embodiment of the invention, the determination of whether a block is "good" or "bad" (i.e., valid or invalid) is performed by checking two spare bytes in the first two pages of each block if the values of these bytes contain at least one '0', then the respective block(s) is invalid (or bad). Good blocks are designed in the Starter-Block Reregister 246. Upon identification of a first good starter block (which may be any of the N blocks in the section 110), the NAND FC 244 reads the pages of the block, and checks for errors in the page. Detected errors are first corrected using the ECC mechanism mentioned above. If such correction is not possible, according to an embodiment of the invention, the same page in the next good block in the sector 110 is read. If such page also contains uncorrected error bits, the next good block is accessed, until a valid page is detected.

This process of reading a complete starter block from the starter section 110 will be further described with reference to FIG. 3 which shows an arrangement of an exemplary starter section 300. The starter section 300 includes 4 blocks 310 through 340, where each block includes 12 pages. It should be noted that the arrangement 300 depicted herein is intended for exemplary purposes and should not be understood as to limit the scope of the invention. For the sake of example, only block 310 is a bad block and the first good starter block is block 320, pages that contain uncorrectable errors are marked with X. The apparatus 240 fetches the pages 320-0 through 320-6 of block 320. As page 320-7 is invalid, the apparatus 240 reads page 330-7 from the next block 330. As page 330-8 is invalid, the apparatus 240 sequentially accesses the good block 340 to read the page 340-8. However, this page is also invalid, thus the process reads the page 320-8 from the block 320 (block 310 is a bad block, thus is not accessed by the apparatus 240). As all pages 320-9 through 320-11 are valid, the apparatus 240 reads these pages from block 320. As can be understood from this example, a complete valid starter block consists of pages 320-0 through 320-6, 330-7, and 320-8 through 320-11.

As mentioned above all the blocks in the starter section 110 are duplicated, thus include the same content. Thus, their respective pages are also the same. It should be appreciated that the process performed by the apparatus 240 significantly increases the probability to fetch a complete valid starter block, thus to provide reliable booting. In comparison to other solutions where the boot code is kept only in one block, in the proposed process the boot code is kept in N (N is greater than 2) blocks. In addition, the content of the block can be read from N*P different pages, spread over the starter section 210, where P is the number of pages in each block. In an exemplary embodiment, the N=8 and P=32. It should be further appreciated that as the starter block, hence, the boot code are stored in the NAND flash memory, the code can be updated at any time.

Referring back to FIG. 2, once a complete valid starter block is fetched by the apparatus 240, the CPU 220 reads the starter block (that contains the boot code) from the fetch emulator 242. Thereafter, the CPU 220 issues a command to load the system initialization code in section 120, the OS image in section 130, and/or the user data in section 140 to the internal memory 230. Upon reception of such command, the apparatus 240, using the NAND FC 244, loads the data in the memory 100 to the internal memory 230 under the memory controller 235. Thereafter, the CPU 220 accesses the OS code or application program code stored in the code section of the internal memory. It should be noted that data read from the NAND flash memory 100 is checked for errors, by the NAND FC 244. Detected errors are corrected using the ECC.

Figure 4:
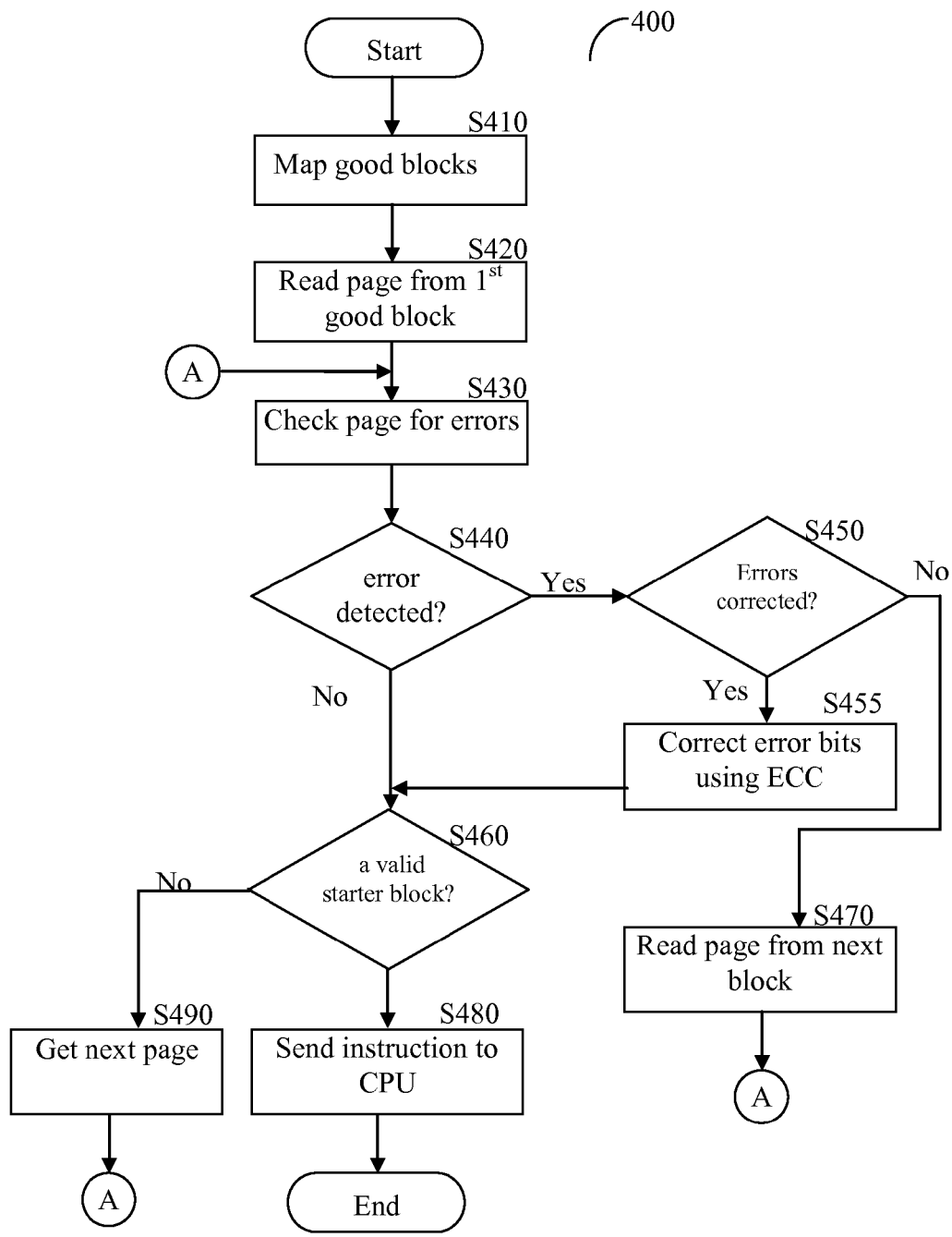
FIG. 4 is a flowchart describing a method for reliable booting according to an embodiment of the invention.

FIG. 4 shows an exemplary and non-limiting flowchart 400 illustrating the method for reliable booting of a CPU in accordance with an embodiment of the invention. The method will be described with a reference to the SoC 200 illustrated in FIG. 2. The process starts when the SoC 200 is powered on or reset and the fetch emulator 242 receives an instruction to fetch the boot code saved in the starter section 110.

At S410, the good blocks in the starter section are determined and designated in the Starter-Block Register 246. As mentioned above, a block is determined to be a good block if the spare bytes (e.g., 0-th and 1-st bytes) of the first two pages in a block include only '1' values. At S420, the NAND FC 244 is set with address of the first good block to read the pages contained therein. At S430, a page read from a starter block is checked for error bits. At S440, it is determined if the page contains error bits, and if so at S450 it is further checked if the error bits can be corrected using the ECC mechanism. If affirmative, error bits are corrected by the ECC mechanism and execution continues with S460. Otherwise, at S470 the NAND FC 244 is set with the address of the next good block (designated in the register 246) to read a page having of the same page number as the previously read invalid page. Then execution returns to S430. As described in detail above, the process sequentially accesses the good blocks designated in the register 246 until a valid page is detected. If such page is not found in the starter sector 110, then a message is generated indicating a boot failure.

At S460, it is checked if a complete valid starter block has been read, and if so at S480, an instruction is generated by the fetch emulator 242 to the CPU 220 to fetch the starter block. It should be noted that the CPU 220 is idle from the time that an instruction to fetch the starter block is issued until the fetch emulator 242 replies that the starter block is ready. If S460 results with a No answer, at S490 the next page is retrieved from the block that the NAND FC 242 is set to read. Then, execution returns to S430.

The principles of the invention can be implemented as hardware, firmware, software or any combination thereof. Moreover, the software is preferably implemented as an application program tangibly embodied on a program storage unit, a non-transitory, computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. An apparatus configured to enable booting from a NAND flash memory, the apparatus comprising:
   a NAND flash controller configured to be connected to the NAND flash memory, wherein the NAND flash memory is configured to include at least a starter section including a predefined number of blocks to store copies of a boot code; and
   a fetch emulator configured to identify a valid block, from among the predefined number of blocks, based on values of spare bytes on pages of the predefined number of blocks.

2. The apparatus of claim 1, wherein the fetch emulator is configured to be connected to the NAND flash controller and to a central processing unit (CPU), wherein the CPU is configured to boot from the boot code contained in the valid block.

3. The apparatus of claim 1, wherein the CPU is configured to be connected to an internal memory through a memory controller, and the NAND flash controller is configured to load a system initialization code, an, operating system image, and user data to the internal memory from the NAND flash memory.

4. The apparatus of claim 3, wherein the NAND flash memory is further configured to include a system initialization code section, an operating system image section, and a user data section to respectively store the system initialization code, the operating system image, and the user data.

5. The apparatus of claim 1, wherein the fetch emulator is further configured to identify a complete starter block which includes at least one other valid block from among the predefined number of blocks.

6. The apparatus of claim 1, wherein the fetch emulator is further configured to:
   map the identified valid block in the starter section;
   read each page from the mapped valid block;
   check whether the read page includes error bits; and
   correct the error bits in the read page when it is determined that the read page includes error bits.

7. The apparatus of claim 6, wherein the fetch emulator is configured to correct the error bits using an error correction codes (ECC) mechanism.

8. The apparatus of claim 6, wherein the fetch emulator is further configured to sequentially access a next identified valid block in the starter section to read a page corresponding to a previously read page when it is determined that the error bits in the previously read page cannot be corrected using the ECC mechanism.

9. The apparatus of claim 8, wherein the fetch emulator is configured to sequentially access additional identified valid blocks until a valid page including no error bits is read and the complete starter block includes only valid pages.

10. The apparatus of claim 8, wherein all the predefined number of blocks substantially include the same content.

11. The apparatus of claim 6, wherein the fetch emulator is further configured to save mapping information of identified valid blocks in a register.

12. The apparatus of claim 1, wherein the predefined number of blocks is greater than two.

13. A method for ensuring booting from a NAND flash memory, the method comprising:
   receiving a fetch instruction from a central processing unit (CPU) to retrieve a boot code;
   identifying a valid block, from among a predefined number of blocks, based on values of spare bytes on pages of the predefined number of blocks, the predefined number of blocks being configured to store copies of the boot code, and to be included in a starter section that is part of the NAND flash memory; and
   instructing the CPU to boot from the boot code that resides in the valid block.

14. The method of claim 13, further comprising:
   reading each page from the valid block in the starter section;
   checking whether the read block includes error bits; and
   correcting the error bits in the read page when it is determined that the read page includes error bits.

15. The method of claim 14, wherein the correcting the error bits comprises correcting the error bits using an error correction codes (ECC) mechanism.

16. The method of claim 15, further comprising:
accessing a next identified valid block in the starter section to read a page corresponding to a previously read page when it is determined that the error bits in the previously read page cannot be corrected using the ECC mechanism.

17. The method of claim 16, wherein the accessing comprises sequentially accessing additional identified valid blocks until a valid page including no error bits is read and the complete starter block includes only valid pages.

18. The method of claim 16, wherein all the predefined number of blocks substantially include the same content.

19. The method of claim 14, further comprising:
mapping the identified valid block; and
saving information about the mapped valid block in a register.

20. The method of claim 13, wherein the predefined number of blocks is greater than two.

21. The apparatus of claim 1, wherein the fetch emulator, is configured to identify the valid block based on values of two spare bytes on a first two pages of the predetermined number of blocks.

22. The apparatus of claim 21, wherein the fetch emulator is configured to identify the valid block when any of the values of the two spare bytes on the first two pages is not a zero.

* * * * *